United States Patent [19]
Neber

[11] Patent Number: 5,398,803
[45] Date of Patent: Mar. 21, 1995

[54] ARRANGEMENT FOR TRANSPORTING OBJECTS, PARTICULARLY TUBES OF GLASS, PLASTIC MATERIAL, ETC.

[75] Inventor: Fritz Neber, Schwäbisch Hall, Germany

[73] Assignee: Groninger & Co. GmbH, Crailsheim, Germany

[21] Appl. No.: 111,707

[22] Filed: Aug. 25, 1993

[30] Foreign Application Priority Data

Dec. 23, 1992 [DE] Germany .................. 42 43 786.5

[51] Int. Cl.⁶ .................. B65G 29/00; B65G 37/00
[52] U.S. Cl. .................. 198/470.1; 198/803.8
[58] Field of Search ........... 198/470.1, 481.1, 482.1, 198/803.8

[56] References Cited

U.S. PATENT DOCUMENTS 3,687,285  8/1972  Messervey ............... 198/482.1
4,165,809  8/1979  Klein et al. ............ 198/468.11
4,938,337  7/1990  Jowitt et al. ........... 198/470.1

FOREIGN PATENT DOCUMENTS 3133341  3/1983  Germany .............. 198/470.1

*Primary Examiner*—Andres Kashnikow
*Assistant Examiner*—Christopher G. Trainor
*Attorney, Agent, or Firm*—Michael J. Striker

[57] ABSTRACT

An arrangement for transporting objects, in particular tubes composed of glass, plastic and the like, has a circular rotating support having an edge and provided with a plurality of outwardly open receptacles on the edge spaced from one another for receiving individual objects so that the objects can be received into the receptacles and removed from them, and each of the receptacles is formed as a clamping holder formed for clampingly holding a corresponding object received in the receptacle.

31 Claims, 2 Drawing Sheets

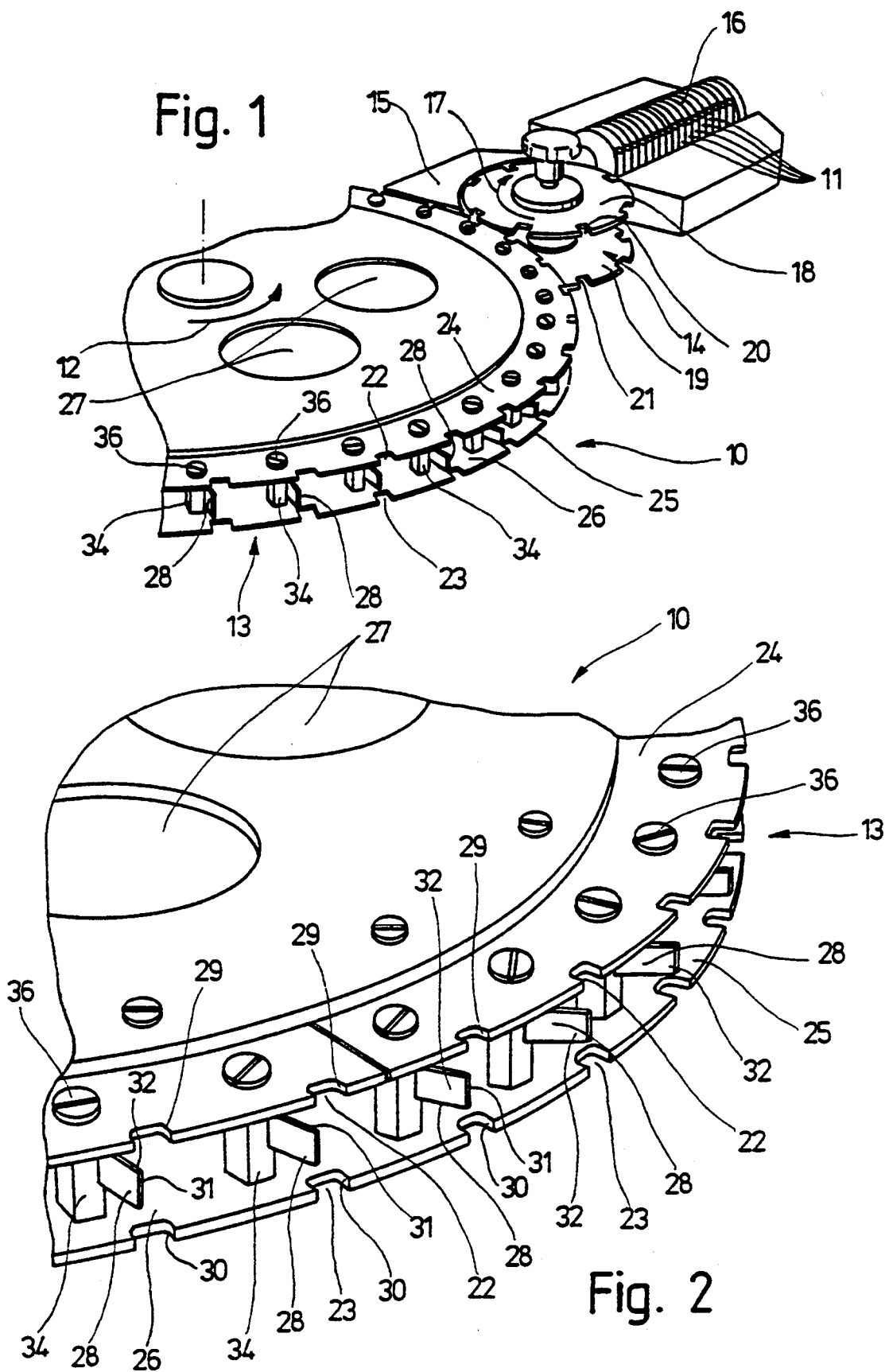

5,398,803

ARRANGEMENT FOR TRANSPORTING OBJECTS, PARTICULARLY TUBES OF GLASS, PLASTIC MATERIAL, ETC.

BACKGROUND OF THE INVENTION

The present invention relates to an arrangement for transporting objects, in particular tubes composed of glass, plastic material, and the like. Transportation of such objects which are composed of sterilizable glass encounter substantial difficulties. Glass tubes which are sterilized for example in a chamber under a temperature of over 300° C. are heated and substantially cooled. They have a very rough surface which in combination with the high hardness of the glass, scratch and roughen surfaces on contact, especially on friction contact. This surface roughness leads to the situation that during the operation the glass which is brought in contact is scratched on its outer surface or damaged in a similar manner. Moreover, particles produced by wear travel to the interior of hollow objects from their ends, for example from below and can contaminate the sterilized object. In particular when the objects have a smaller diameter, such inwardly penetrating particles produced by wear cannot be removed or can be removed with great difficulty after costly subsequent treatment. Moreover, there is a danger that the objects composed of glass are damaged during transportation and defective particles or splinters are further transported. Such splinters or broken pieces damage components of the arrangement and lead to further particles produced by wear and broken parts which disturb the operation. The above-described disadvantages are applicable for known transporting arrangements with transporting stars surrounded by an outer counter guide and provided with a sliding path for supporting objects to be transported, so as to prevent falling of the objects from the transporting star. In these arrangements particles created by wear are produced between the objects on the one hand and the sliding path on the other hand. Furthermore, damaged particles, especially small glass pipes, splinters and the like, can be transported further with related disadvantages. In addition, due to the worsened sliding properties of freshly sterilized glass the sliding path is subjected to a grinding load. If hard material is utilized for the sliding path, the sliding properties are poor. Plastic materials are not suitable for the sliding path since they are damaged by splinters.

SUMMARY OF THE INVENTION

Accordingly, it is an object of the present invention to provide an arrangement for transporting objects of the above-mentioned type, which avoids the disadvantages of the prior art.

In keeping with these objects and with others which will become apparent hereinafter, one feature of the present invention resides, briefly stated, in an arrangement for transporting objects, which has a circular, rotating support provided along its outer edge with spaced outwardly open receptacles for individual objects to be received and entrained by the support, wherein each receptacle or each receptacle pair is formed as a clamping holder which clampingly holds a corresponding object.

When the arrangement is designed in accordance with the present invention, it prevents formation of damaging particles produced by wear and has a high stability over time with reduced danger of all scratching or damaging of objects especially when they are composed of glass, as well as of parts in contact with them.

Since each receptacle or each receptacle pair is formed as a clamping holder, a lower sliding path for securing the transported object against sliding is not needed, so that the danger of formation of particles produced by wear is substantially reduced. Also, there is no risk that splinters or broken parts produced during transportation of objects formed as glass pipes remain on the lower sliding path and are transported further so as to disturb the operation. If broken parts or splinters are produced in the receptacle or the receptacle pair, they fall through without being transported further. The arrangement is therefore substantially self cleaning in this aspect. It is further advantageous that the arrangement is substantially stable and can operate disturbance-free over a longer service life without problems due to damage, wear, etc. Due to the clamping hold and since the lower sliding path is not needed, the object and in particular those composed of glass are protected from scratching and other damages. The arrangement is extraordinarily simple, can be easily observed and is operationally safe due to the clamping hold. The design of the arrangement with clamping holders further implies that the clamping force can be adjusted and thereby in a simple manner adapted to objects to be transported, especially within limits of the diameters or other transverse dimensions and with regard to the thickness. The clamping force can be adjusted so that it can be varied in each case to prevent breakage of the object.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic perspective view of part of an arrangement for transporting objects, and especially pipes composed of glass in accordance with the present invention;

FIG. 2 is a perspective view of a portion of the arrangement of FIG. 1 on an enlarged scale;

DESCRIPTION OF PREFERRED EMBODIMENTS

Figure 3:
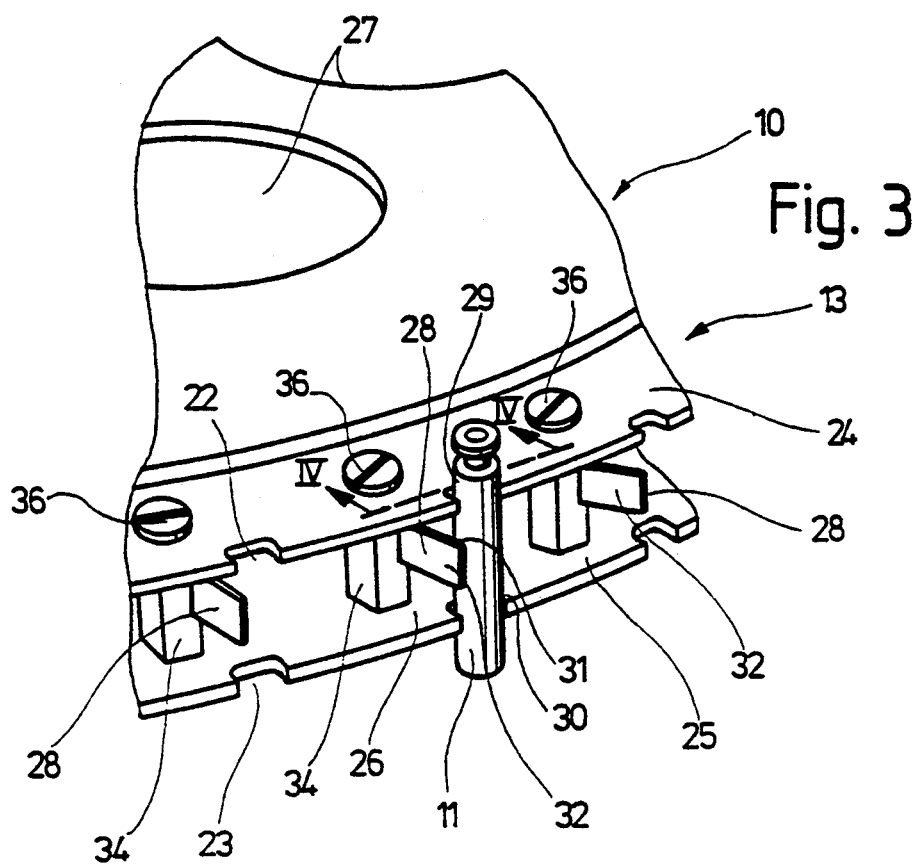
FIG. 3 is a perspective view of a portion of FIG. 2 with an object which is held on a support.

An arrangement in accordance with the present invention is identified as a whole by reference numeral 10 and used for transporting objects 11, in particular tubes composed of glass, for example cylinders for injection, syringes and the like. The object 11 to be transported naturally can be tubes composed of plastic or another material or similar objects. In the shown embodiment in which the objects are glass tubes with relatively thin walls, the objects 11 are transported by the arrangement 10 in a vertical orientation and their upper and lower ends are open. The part of the arrangement 10 shown in FIGS. 1–5 is located in a sterile space, in which a sterile atmosphere with a laminar flow is provided. The objects 11 to be transported, in particular glass tubes, are first sterilized in a not-shown space, for example by heating to more than 300° C. and subsequent cooling. The objects 11, in particular glass tubes, have a very rough surface due to their sterilization.

The arrangement then has a circular support 13 which is rotatably driven in the direction of arrow 12. It further has a supply device 14 located near the support 13 with an outer counter guide 15 which surrounds the supply device and a screw 16 located in front of the supply device for supplying the object 11 to the supply device 14. The supply device 14 rotates opposite to the support 13 in accordance with the arrow 17. The supply device 14 has two co-axial rings or disks 18 and 19 which are parallel and arranged at a distance over one another. At their outer edge they are provided with receptacles 20 and 21 for the objects 11, and the receptacles are located one above the other so that they coincide and are flush with each other. The receptacles 20, 21 have a diameter which at least corresponds to the diameter of the objects 11, for example glass pipes. A small extra dimension is provided in the size of the receptacles in the peripheral direction.

The support 13 also has a plurality of outwardly open receptacles 22, 23 which are arranged along an outer edge at distances from one another for receiving individual objects 11. The objects 11 are received in the receptacles 22, 23 and entrained by the support 13. The receptacles 20, 21 of the supply device 14 follow with the same pitch in the peripheral direction one after the other as the receptacles 22, 23 of the support 13. By means of the rotating screw 16 in which the objects 11 are retained in individual thread-like convolutions, the objects 11 are transported forwardly and supplied to the supply device 14. Then each of the objects 11 is introduced into a receptacle pair 20, 21 of the supply device 14. During rotation of the supply device 14, the corresponding object 11 is supplied to a peripherally adjacent receptacle pair 22, 23 of the support 13. The object 11 is pressed into the receptacle 22, 23 of the receptacle pair as can be seen hereinbelow. During further rotation of the support 13 in the direction of the arrow 12 the objects retained in it are supplied to different stations which are arranged around the support 13 and not shown in the drawings to perform further mounting steps. In one station a flange cap is mounted on the upper end of the object 11 and flanged on it. In a next station a finger flange is pressed on each object 11 from below. During further rotation the objects 11 leave the support 13, they are withdrawn from the receptacle pair 22, 23 and transported to further paths, which are not illustrated in the drawings.

In the shown embodiments the support 13, similar to the supply device 14, is composed of two circular rings or disks 24, 25 which are arranged co-axially and parallel to and at a distance over one another. They are provided with coinciding receptacles 22, 23 on their outer edge. Each receptacle pair 22, 23 is formed as a clamping holder 26. The rings or disks 24, 25 are provided on their surfaces with large passages 27 for unimpeded air flow without whirling, to insure a laminar flow.

Figure 4:
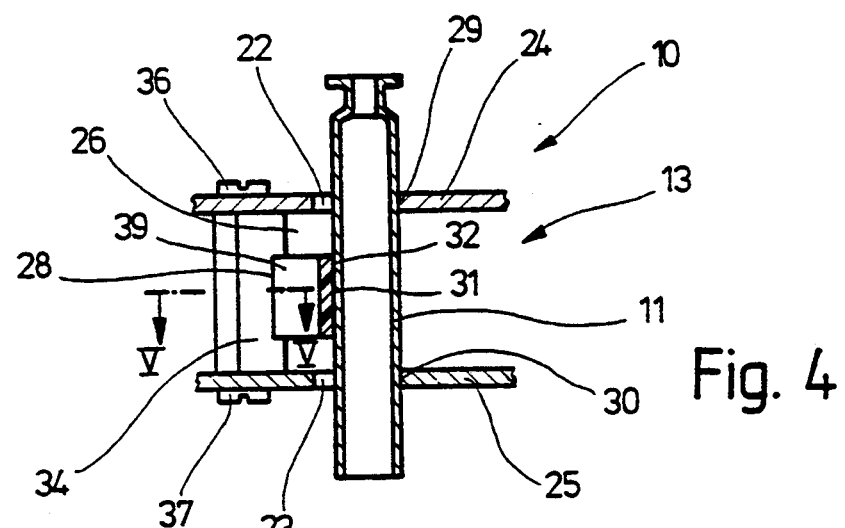
FIG. 4 is a view schematically showing a vertical section taken along the line IV—IV in FIG. 3.

The coinciding receptacles 22, 23 provided in the rings or disks 24, 25 are substantially U-shaped. Their width measured in a particular direction is at least as great as the diameter of the objects 11 received in the receptacles and transported by the support 13. Each receptacle pair 22, 23 is formed as a clamping ring 24 in which an object 11 received in the receptacle 22, 23 can be clampingly held, as shown in FIGS. 3 and 4. Each receptacle pair 22, 23 is provided with at least one spring element 28 which is held on the support 13. The corresponding object 11 in the receptacle pair 22, 23 is pressed against the spring action of the spring element 28 and clampingly held by it in the pressed condition in the receptacle pair 22, 23. In the shown embodiment the support 13 is provided in each receptacle pair 22, 23 with a three-point abutment for the corresponding object 11. The three-point abutment is formed by the receptacles 22, 23 of one receptacle pair and the associated spring element 28. The three-point abutment is formed by two abutment points 29, 30 located at a distance from one another and coinciding with one another on one side, and further by a third abutment point 31 at the height between both abutment points 29, 30 and therefore at the other side. In the shown embodiment the third abutment point 31 is formed by the corresponding spring element 28, while the two other abutment points 29, 30 which are located over one another are formed by the inner surfaces of the corresponding receptacles 22, 23 of the support 13 located at the right side in FIGS. 3 and 4.

In another not-shown embodiment the support 13 has only one substantially circular ring or disk, for example analogous to the ring or disk 24, and it has receptacle 22 on its outer edge. Each receptacle 22 is provided with a spring element held by the support 13 and similar to the spring element 28, so that the corresponding object 11 in the receptacle 22 is pressed against its spring action and is clampingly held in the pressed condition in the receptacle. The spring element 28 can be held inside each receptacle 22 or instead can be placed at a distance above or below the disk 24. In a not-shown embodiment with only one disk, also a three-point abutment for the corresponding object 11 is provided. In this case two abutment points located at a distance and over one another are formed by two spring elements 28 on one side. In this construction one spring element is located above and one spring element is located below the disk 24. The third abutment point is provided at the height between the two above-mentioned abutment points at another side and formed there for example by an inner surface of the corresponding receptacle 22 of the single disk 24.

In another not-shown embodiment the support 13 is also composed of one ring or disk 24 with corresponding receptacles 22. Each receptacle is provided with two adjacent spring elements 28 cooperating as a tongue, so that a pressed-in object 11 is clampingly held between them. The spring elements 28 cooperating as a tongue clampingly hold the object 11 therebetween. In an especially simple manner in this example, instead of the U-shaped receptacles in the ring or disk 24, the receptacles can be formed by two adjacent spring elements 28 cooperating as a tongue. In this construction, U-shaped receptacles 22 are not needed.

In the shown embodiment, one spring element 28 is associated with each receptacle pair 22, 23. In another not-shown embodiment an upper and a lower spring element 28 can be associated with each receptacle 22. In the same way, an upper and a lower spring element can be associated with each receptacle 23 in the disk 25. In another not-shown embodiment each spring element 28 can be located in the receptacle 22 and especially inside its plane. In the same manner, in the other receptacles 23 and substantially inside their plane, a corresponding spring element 28 can be provided as well.

It is especially advantageous that in the inventive arrangement the three-point abutment is provided, in which the corresponding spring element 28 is located at the height between both rings or disks 24 and 25 and therefore is arranged so that at least one spring element 28 forms the third abutment surface, while the inner surfaces of the receptacle pair 22, 23 of both disks or rings 24, 25 form two other opposite abutment points. The three-point abutment has the special advantage that the object 11 is clampingly held between the abutment points 29, 30, 31 and it falls out of the clamping holder 26 when it is broken. The special advantage of the three-point abutment with the abutment points 29, 30, 31 is that broken pieces or individual parts of the broken objects 11 are not retained on the support 13. They fall beyond the clamping holder 26 and do not interfere with the latter. The large-surface passages 27 additionally guarantee the laminar flow and provide for the advantage that splinters or broken pieces can easily fall downwardly.

The spring element 28 extends with a springy end or end region 32 transversely into the receiving region of each receptacle 22, 23. Each spring element 28 is held directly or indirectly on the support 13, for example between both rings or disks 24 and 25, by its end 33 which is opposite to the springy end or end region 32. Each spring element 28 is held on the support 13 releasably and adjustably with regard to its spring force and clamping force. In the shown embodiment the fixation of each spring element 28 on the support 13 is provided directly. Each spring element is mounted on a special substantially rectangular holder 34 by screws 35. Each holder 34 in turn is held releasably and adjustably on the support 13, for example between both rings or disks 24, 25. It is advantageous when the holder 34 is clamped between both rings or disks 24, 25, for example by both side screws 36, 37. The screws are screwed in in threaded openings in the holder 34 and clamp the holder between both rings or disks 24, 25 in the corresponding adjusted position.

Each spring element 28 on its springy end or end region 32 extending in the region of the corresponding receptacle pair 22, 23 narrows in a substantially a wedge-shaped manner to its end. This is obtained, for example, in that each spring element 28 at its free end facing the receptacles 22, 23 has an incline 38. Due to this incline it is easier for the object 11 during pressing by the supply device 14 to overcome in each receptacle pair 22, 23 the spring force of the spring element 28 which during pressing the object 11 is at least insignificantly pressed away against the spring force outwardly until the object 11 passes the incline 38. Then the third abutment point 31 of the spring element 28 springily acts on it and presses the object against two opposite abutment points 29, 30 of the receptacle pair 22, 23 in a springy manner, to be clampingly held in the support 13.

Each spring element 28 is composed of a springing-out springy tongue 39 which can be composed of metal, for example, steel. It is especially advantageous when each spring element 28, in particular each spring tongue 39, is composed of synthetic plastic material and especially of synthetic plastic material with good springy properties. It is especially advantageous also when each spring element 28 is composed of a fiber-reinforced, in particular glass fiber reinforced, synthetic plastic material. It is also especially advantageous when each spring element 28, especially each spring tongue 39, is composed of an epoxy resin with substantially a 65% glass fiber fraction. When the spring element 28, in particular the spring tongue 39, is composed of synthetic plastic material in the above-described manner, then on the one hand it has good springy properties, and the spring element 28 is elastic over a long time and can perform spring functions as the clamping holder 26. It is further especially advantageous that the thusly formed spring element 28 which is received in the support 13 and transported in the peripheral direction, does not scratch or damage in any other way the object held in the support. This is true first of all for the object, especially pipes composed of glass. The spring element 28 composed of synthetic plastic material does not cause the risk that such spring element due to the roughness of the sterilized object 11 composed of glass is scratched, roughened and worn out. Also, there is no danger that particles are produced by wear, which otherwise could penetrate into the upper and lower ends of the object 11 and dirty, contaminate and the like of the object. Also, the advantage of such a spring element 28 composed of synthetic plastic material is that the spring element 28 since it cannot be roughened or scratched by rough glass, does not contain any surface structure during the operation which can then scratch or damage the object 11 clamped in the clamping holder 26 over its surface.

The object 11, for example the glass pipes supplied by the screw 16 are separated in the supply device 14 with a pitch corresponding to the receptacle pairs 22, 23 in the support 13. When the receptacle pair 20, 21 of the supply device 14 and the receptacle pair 22, 23 of the support 13 are located over one another, an object 11 is pressed from the supply device 14 into the receptacle pair 22, 23 of the support 13 from outside. It is therefore reliably guaranteed that the corresponding object 11 finds its way into the corresponding receptacle pair 22, 23 of the support 13. During the pressing of each object 11 into the receptacle pair 22, 23 of the support 13, the object runs first against the incline 38 of the spring element 28 which is pressed outwardly against its spring tensioning, until the corresponding object 11 arrives in the region of both abutment points 29, 30 of the receptacle pair 22, 23 and then after running over the incline 38 is supplied into the region of the third abutment point 31.

Figure 5:
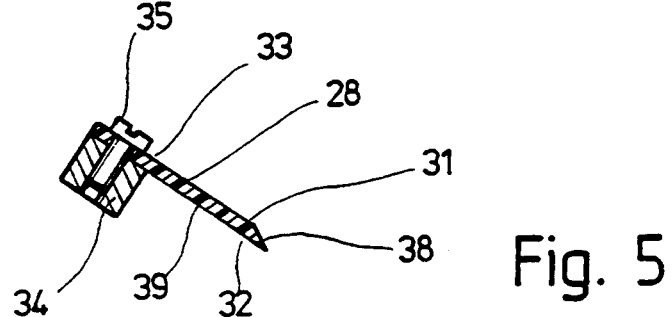
FIG. 5 is a view schematically showing a horizontal section taken along the line V—V in FIG. 4.

As shown in particular in FIGS. 4 and 5, the corresponding spring element 28 of each receptacle pair 22, 23 is somewhat inclined so that the inlet at the outer end is smaller than the diameter of the object 11, and in particular the inlet which is formed before the three abutment points 29, 30, 31. The dimension of the receptacles 22, 23, which narrow at the side of the spring element 28, increases in the radial direction further inwardly to the base of the receptacles 22, 23, and in particular to the dimension measured in the peripheral direction and corresponding to the diameter of the object 11. Thereby each object 11 is snappingly pressed into the receptacle pair 22, 23 with the spring element 28, and retained there in a springy, elastic and clamping way by the clamping holder 26. Therefore during rotation of the support 13 it can perform successive functions when it passes the individual stations, for example by applying flange caps or flanges in one station and by supplying and pressing-on of the lower finger flanges in a subsequent station.

It is advantageous when the height of the spring element 28 from each receptacle 22, 23 is somewhat greater than the diameter of an object 11, in particular a glass tube.

It will be understood that each of the elements described above, or two or more together, may also find a useful application in other types of constructions differing from the types described above.

While the invention has been illustrated and described as embodied in an arrangement for transporting objects, particularly tubes of glass, plastic material, etc., it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a plurality of spring elements each arranged on said support and each associated with respect to one of said receptacles so that a spring action of said spring element presses an object into a respective one of said receptacles and clampingly holds the same in said receptacle, said support having a three-point abutment associated with each of said receptacles and including two abutment points located one under the other and coinciding with one another at one side and a third abutment point located at a height between said first two abutment points at another side.

2. An arrangement as defined in claim 1, wherein each of said spring elements is held inside a respective one of said receptacles.

3. An arrangement as defined in claim 1, wherein at least said third abutment point is formed by a respective one of said spring elements.

4. An arrangement as defined in claim 1, wherein said two first abutment points are formed by an inner surface of a respective one of said receptacles.

5. An arrangement as defined in claim 1, wherein said support is a single circular ring in which said receptacles are formed as said clamping holders.

6. An arrangement as defined in claim 5; and wherein said a plurality of spring elements arranged on said support so that each of said spring elements is located inside a respective one of said receptacles.

7. An arrangement as defined in claim 1, wherein each spring element has a springy end extending transversely into a receiving region of each of said receptacles.

8. An arrangement as defined in claim 7, wherein each of said spring elements has an end opposite to said springy end and is held on said support.

9. An arrangement as defined in claim 1, wherein each of said spring elements is held on said support releasably and adjustably with regard to its spring force and clamping force; and further comprising means for releasably holding each of said spring elements on said support.

10. An arrangement as defined in claim 9; and further comprising a holder which is held on said support releasably and adjustably, each of said spring elements being mounted on said support.

11. An arrangement as defined in claim 1, wherein each of said elements is formed as a spring tongue.

12. An arrangement as defined in claim 1, wherein each of said .spring elements is composed of metal.

13. An arrangement as defined in claim 1, wherein each of said spring elements: is composed of steel.

14. An arrangement as defined in claim 1, wherein each of said spring elements is composed of synthetic plastic material.

15. An arrangement as defined in claim 1, wherein each of said spring elements is composed of a synthetic plastic material with high springy properties.

16. An arrangement as defined in claim 1, wherein each of said spring elements is composed of a fiber-reinforced epoxy resin.

17. An arrangement as defined in claim 1, wherein each of said spring elements is composed of a glass fiber reinforced epoxy resin.

18. An arrangement as defined in claim 1, wherein each of said spring elements is composed of an epoxy resin with substantially 65% of a glass fiber fraction.

19. An arrangement as defined in claim 1; and further comprising a supply device which is arranged near said support and having an outer edge with a plurality of recesses provided for receiving objects and spaced from one another by distances corresponding to distances between said receptacles of said support.

20. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle, said support including two co-axial and parallel circular rings arranged over one another at a distance therebetween and provided with coinciding receptacles on their outer edges so as to form receptacle pairs; and a plurality of spring elements arranged on said support and each associated with a respective one of said receptacle pairs so as to form with said respective receptacle pair a respective one of said clamping holders.

21. An arrangement as defined in claim 20, wherein at least one of said spring elements associated with a respective one of said receptacle pairs is arranged at a height between said rings so that said spring element forms a third abutment point while inner surfaces of said receptacle pair of said both rings form two other abutment points.

22. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a plurality of spring elements each arranged on said support and each associated with respect to one of said receptacles so that a spring action of said spring element presses an object into a respective one of said receptacles and clampingly holds the same in said receptacle, each spring element having a springy end extending transversely into a receiving region of each of said receptacles, each of said spring elements having an end opposite to said springy end and is held on said support, said support including two parts located one over the other, said opposite end of said spring element being held between said parts of said support.

23. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; a plurality of spring elements each arranged on said support and each associated with respect to one of said receptacles so that a spring action of said spring element presses an object into a respective one of said receptacles and clampingly holds the same in said receptacle, each of said spring elements being held on said support releasably and adjustably with regard to its spring force and clamping force; means for releasably holding each of said spring elements on said support; and a holder which is held on said support releasably and adjustably, each of said spring elements being mounted on said support, said support having two parts located one above the other, said holder being clamped between said two parts.

24. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a plurality of spring elements each arranged on said support and each associated with respect to one of said receptacles so that a spring action of said spring element presses an object into a respective one of said receptacles and clampingly holds the same in said receptacle, each of said spring elements having a springy end extending into a receiving region of a respective one of said receptacles and narrowing in a substantially wedge-shaped manner towards said end.

25. An arrangement as defined in claim 24, wherein each of said spring elements at said end is provided with an incline.

26. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a supply device which is arranged near said support and having an outer edge with a plurality of recesses provided for receiving objects and spaced from one another by distances corresponding to distances between said receptacles of said support, said supply device having two co-axial and parallel circular disks arranged at a distance from one another.

27. An arrangement as defined in claim 26; and further comprising a plurality of spring elements each arranged on said support and each associated with respect to one of said receptacles so that a spring action of said spring element presses an object into a respective one of said receptacles and clampingly holds the same in said receptacle.

28. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a supply device which is arranged near said support and having an outer edge with a plurality of recesses provided for receiving objects and spaced from one another by distances corresponding to distances between said receptacles of said support, said supply device having two co-axial and parallel circular rings arranged at a distance from one another.

29. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; a supply device which is arranged near said support and having an outer edge with a plurality of recesses provided for receiving objects and spaced from one another by distances corresponding to distances between said receptacles of said support; and a counter guide arranged outside and surrounding said supply device.

30. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; a supply device which is arranged near said support and having an outer edge with a plurality of recesses provided for receiving objects and spaced from one another by distances corresponding to distances between said receptacles of said support; and a screw located in front of said supply device for transferring the objects to said supply device.

31. An arrangement for transporting objects, in particular tubes composed of glass, plastic and the like, comprising a circular rotating support having an edge and provided with a plurality of outwardly open receptacles on said edge spaced from one another for receiving individual objects so hat the objects can be received into said receptacles and removed from them, each of said receptacles being formed as a clamping holder formed for clampingly holding a corresponding object received in said receptacle; and a plurality of spring elements each arranged on said support and each associated with respect to one of said receptacles so that a spring action of said spring element presses an object into a respective one of said receptacles and clampingly holds the same in said receptacle, said spring elements including at least one spring element located above and at least one spring element located below each of said receptacles.

* * * * *